United States Patent Office 3,457,780
Patented July 29, 1969

3,457,780
TORQUE MEASURING DEVICE, PRIMARILY FOR THE ADJUSTMENT OF SCREW-TIGHTENING MACHINES
Antoine Agostini, Maisons-Laffitte, France, assignor to Societe des Automobiles Simca, Paris, France
Filed June 1, 1967, Ser. No. 642,790
Claims priority, application France, June 8, 1966, 64,741
Int. Cl. B25b 23/14
U.S. Cl. 73—139       6 Claims

ABSTRACT OF THE DISCLOSURE

A torque measuring apparatus attached to the spindle of a screw-tightening machine having an adapter connecting the spindle of the machine to a rotary spindle in the body of the apparatus. A deformable sleeve is mounted within the body and has one end thereof fixed to said body while the other end thereof is free to rotate in relation to the body. A second adapter fixes a screw to the rotary spindle of the apparatus to allow the screw to be threaded into a test piece slidably and non-rotatably mounted in the free end of the deformable sleeve. Means are mounted between the body and the sleeve for detecting and adjusting the angular displacement of the free end of the sleeve in relation to the body.

---

This invention relates to a torque measuring device, intended primarily for the adjustment of screw-tightening machines.

In the French patent application No. 41,824 dated Dec. 10, 1965, for a "Torque Measuring Device, Primarily for the Adjustment of Screw-Tightening Machines," a torque measuring device intended primarily for the adjustment of screw-tightening machines was described, in which the torque was measured according to the lengthwise deformation undergone by a sleeve containing side openings, one end of which was subjected to the torque action and the other was secured to a specimen screw.

Such a device has important advantages, these being the direct reading of the torque under assembly conditions, independently of the operator, the absence of any friction which might influence the readings and the possibility of determining the relationship between the reading value and the value obtained on the specimen screw, checked after tightening by means of a dynamometer spanner. However, the device concerned in the aforementioned French patent application has the disadvantage that it uses, for the torque measuring device a tube or electric wire of some complexity. Moreover, it does not take into account the speed of rotation of the screw-tightening machine.

The present invention relates to a torque measuring device which does not utilize the axial deformation of the sleeve, but rather its angular deformation, which is read simply with the aid of a comparator. Moreover, a revolution counter is provided for measuring the speed of rotation of the screw-tightening machine, in order to reproduce as far as possible the conditions of adjustment when starting. Provision is also made for a simple device for applying torsional pre-stress to the sleeve and thus making the reading more accurate.

According to the invention, the body of the device contains a sleeve, the mid-portion of which is deformable, one end of the sleeve being fixed to the body while the other end, which is free, can turn in relation to the body, receives a test-piece mounted to freely slide within the sleeve and angularly keyed into the latter. This test-piece has a screwthreaded portion, in which a screw can be engaged, the screw head being fixed to the rotary spindle by an adaptor. Means for detecting and adjusting the angular displacement of the free end of the sleeve in relation to the body are disposed between the body and the sleeve.

Figure 1:
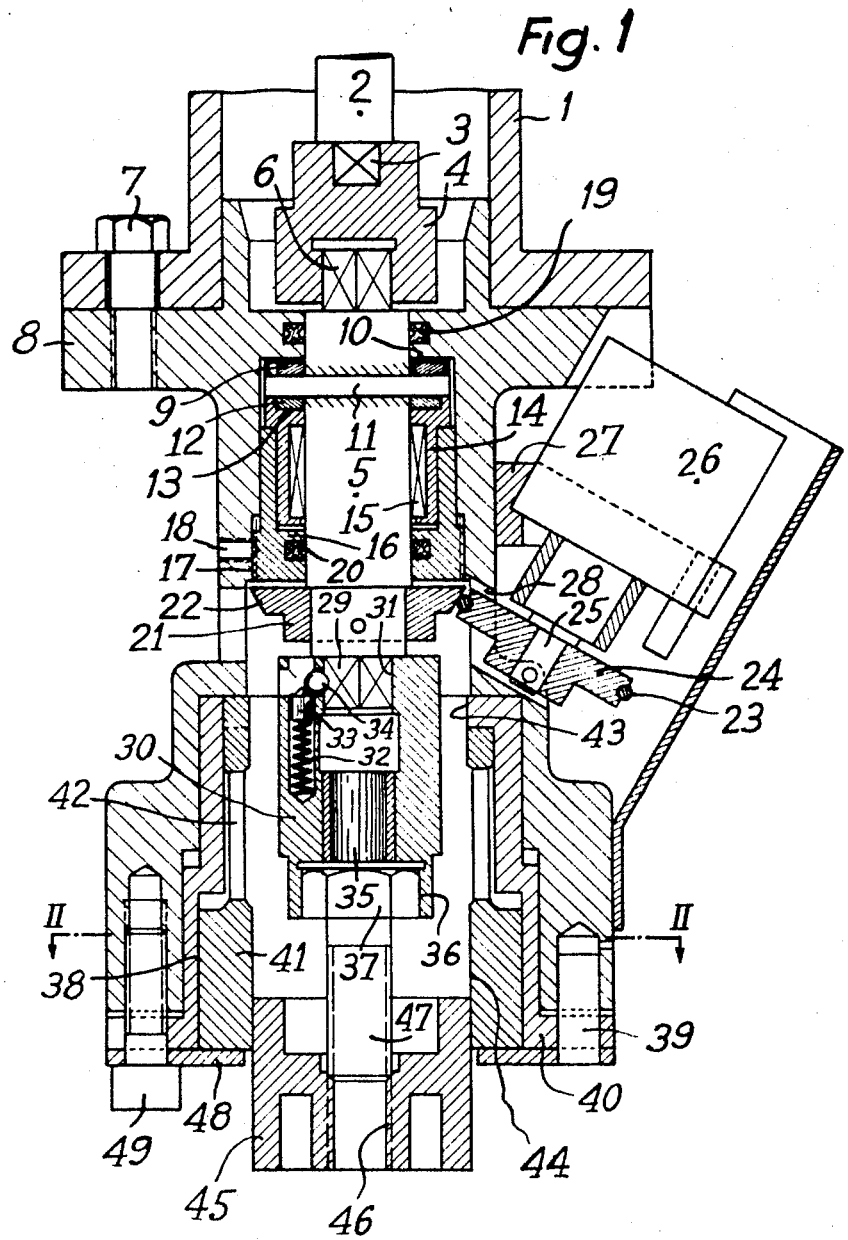
Figure 2:
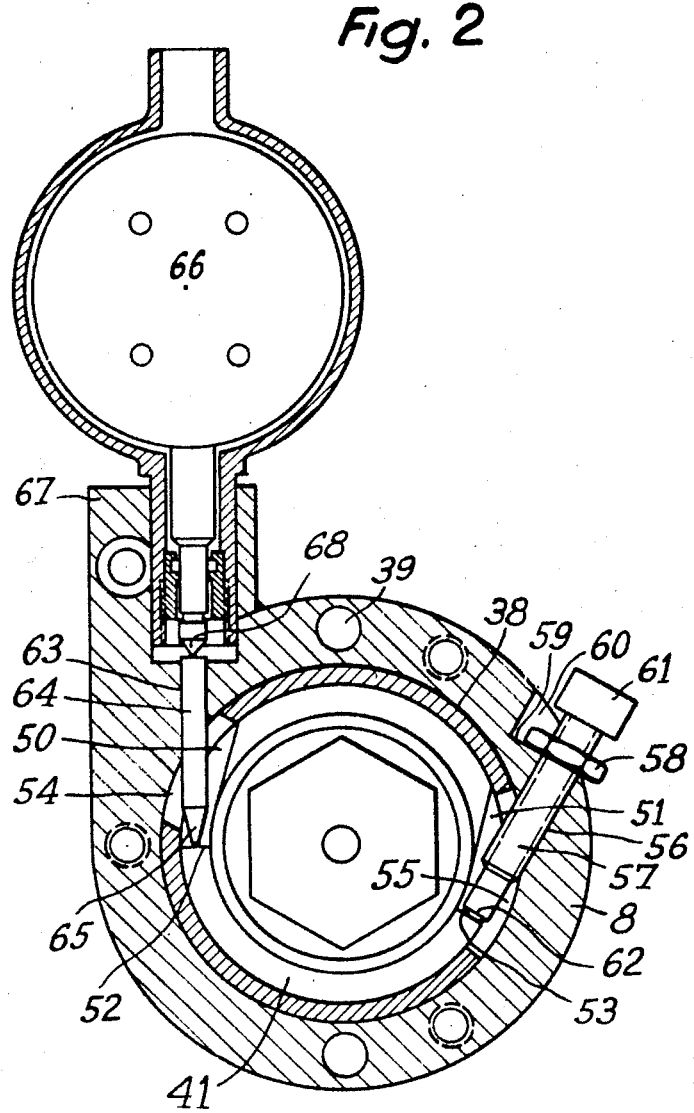

Further features and advantages of the present invention will become apparent from the following description of one practical form thereof, given solely by way of example, in conjunction with the accompanying drawings, in which:

FIGURE 1 is a longitudinal section and elevation of the torque measuring device here proposed and FIGURE 2 is a cross-section along the line II—II in FIGURE 1.

In FIGURE 1, an extension-piece 1, is shown fixed to the screw-tightening machine to which a rotary spindle 2 is mounted. The spindle 2 has a square driving end 3 fixed to an adaptor 4, by which it is connected to a spindle 5. The spindle has a square-ended driven part 6 which fits into a corresponding recess in the adaptor 4. A body 8, containing the torque measuring device of the invention, is secured by the screws 7 to the extension-piece 1.

Axial rigidity for the spindle 5, which has freedom to rotate in the body 8, is provided by: one thrust washer 9 between the inner face 10 of the body 8 and a small flange 11 on the spindle 5; another thrust washer 12 between that flange and an inner shoulder 13 forming part of the housing 14 for a needle bearing 15. The housing 14 is immobilised axially and radially by a bush 16 screwed by means of the thread 17 into the body 8. The bush 16 is locked in the body 8 by a pointed set-screw 18.

Two packing rings 19 and 20 provide a seal for the assembly. The bottom end of the spindle 5 carries a wheel 21 having a frusto-conical rim 22 and which is cottered to the spindle 5.

The roller-wheel 24 cottered to the spindle 25 of a conventional-type revolution counter 26 can be brought into contact with the rim 22 of the wheel 21 by means of a toroidal ring 23, made of a resilient material. The revolution counter 26 is pivoted on a bracket 27 fixed to the body 8, so that the rim 22 of the wheel 21 makes contact with the wheel 23 which drives the revolution counter 26, through an aperture 28 in the body 8.

The spindle 5 has a square lower end 29 on which is mounted an adaptor 30 the top of which contains a cavity 31 adapted to fit the spindle stub 29, to which it can be locked by a ball catch consisting primarily of a spring 32, a plunger 33 and a ball 34. The plunger 33 forces the ball 34 towards the interior of the cavity 31, in order that the ball 34, when caught by a recess or groove in the stub 29, locks the adaptor 30 to the latter. The lower end of the adaptor 30 contains a magnet 35 at the base of a cavity 36 suitably shaped to take the head of a specimen screw 37. In the lower part of the body 8 are mounted, concentrically from outside to inside and coaxial with the spindle of the screw-tightening machine, a tubular member 38 the foot 39 of which prevents it from turning within the body 8 and which carries an external shoulder 40, at the bottom; and a sleeve 41, the central portion of which can undergo torsional deformation by reason of the side slots 42 machined in its walls to weaken this portion. The sleeve 41 is prevented from rotating at the top by a catch 43 on the member 38. The base of the sleeve 41 contains a hexagonal recess 44, into which a specimen or test nut 45, can be slid, this nut being threaded at 46 to take the threaded end 47 of the screw 37. There is also a plate 48, secured by screws 49, which prevents axial movement of the assembly 38–41.

The torque indicating device, of FIGURE 2 consists of two catches 50 and 51, machined in the lower part of the sleeve 41. It is desirable for these catches, which are thick-walled, to be situated diametrically opposite each other. The catches 50 and 51 have faces 52 and 53, respectively, lying substantially in a radial plane. The tubular member 38 contains two openings 54 and 55, situated respectively opposite the catches 50 and 51.

The body 8 contains a threaded hole 56 drilled in a plane perpendicular to the axis of rotation of the screw-tightening machine, to receive the screw 57. The head 61 of the screw 57 is provided with a lock-nut 58, which bears against the face 59 of an external cavity 60 in the body 8. The end 62 of the screw 57 is designed to bear against the face 53 of the catch 51. Opposite the catch 50 and the opening 54 the body 8 contains a hole 63 within which slides a rod 64, the tip 65 of which bears against the face 52 of the catch 50. A comparator 66 is mounted in a side lug 67 of the body 8 in such a manner as to bring the tip 65 of the comparator into alignment with the rod 64 and into contact with one end thereof. As the comparator and its mode of attachment are well known, they will not be described in greater detail here.

One advantageous feature of the invention is that it is possible, with the arrangement described above, to impart some degree of torsional pre-stress to the sleeve 41.

To do this, all that is necessary is to tighten the screw 57. The end 62 of the screw 57, by thrusting against the face 53, will impart a controlled degree of pre-stress to the sleeve 41.

For a clearer understanding of the mode of operation of the invention device, it is assumed that the sleeve 41 has been calibrated, and is in position and subjected to the desired pre-stress by the screw 57.

The body 8 of the torque measuring device is fitted by means of the screws 7 to the extension-piece of the screw-tightening machine and the spindle 5 is connected to the machine spindle 2. The nut 45 along with a screw 37 engaged by only a few turns of the thread 46, is introduced into the hexagonal recess 44 in the sleeve 41, so that the head of the screw 37 fits into the cavity 36 in the adaptor 30 and is held by the magnet 35.

The screw-tightening machine is then started and its speed of rotation can be read as it tightens the screw on the revolution counter 26.

Once the torque tightening the screw 37 reaches the nut 45, the screw-tightening machine is stopped.

At the end of the tightening action, the free bottom end of the sleeve 41 driven by the nut 45 rotates slightly, while the upper part of the sleeve remains held fast by the catch 43. The result of this is that the face 52 of the catch 50 (FIGURE 2) thrusts against the rod 64 and the tip 68 of the comparator 66 to give an indication of the linear displacement proportional to the torque applied by the screw-tightening machine. If the readings of the revolution counter 26 and the comparator 66 agree with the tightening specified for the part which the machine will be called upon to tighten when running under its actual working conditions, all that needs to be done is to withdraw the nut 45, along with the screw 37, and to disconnect the body 8 from the screw-tightening machine, which may be regarded as adjusted and ready for operation.

If, on the other hand, the readings do not agree with the values required, the compressed-air inlet on the screw-tightening machine must be further opened or closed, as the case may be, and the operations described above must be recommenced, either with a fresh test-piece 37–45 or with the same test-piece, the screw 37 first being unscrewed. The adjustment operations should be repeated in this way until correct torque and speed readings are obtained.

With the torque measuring device conforming to the invention, it is possible to obtain a reading of the speed of the machine at the moment the tightening torque is applied, and the tightening torque can be read directly with a comparator without the interposition of pneumatic or hydraulic devices, the supply systems of which may in themselves present difficulties and have drawbacks of their own.

Furthermore, in the example illustrated, one need only provide suitable adaptors 30 for each screw-head that is to be tested, to enable the same body 8 of the torque measuring device to be used.

What is claimed is:

1. A torque measuring device adapted to be fixed to an extension of a screw-tightening machine, comprising a body, a spindle freely rotatable in said body, an adapter connecting said spindle to the spindle of the screw-tightening machine; a sleeve fitted within said body and having a mid-portion capable of undergoing deformation, one end of said sleeve being fixed to said body and the other end being free to rotate in relation to said body; a test piece slidably fitting into said end of said sleeve which is free to rotate, but being keyed angularly to prevent rotation of said test piece relative to said sleeve; said test piece containing a screwthreaded hole to take a screw; the head of said screw being fixed to the rotary spindle of the measuring device by means of a second adapter; and means between the body and the sleeve for detecting and adjusting the angular displacement of the free end of the sleeve in relation to the body.

2. A torque measuring device in accordance with claim 1, characterized by the fact that the means of detecting the angular displacement of the free end of the sleeve in relation to the body consist of a device for measuring linear displacement, fixed to the body, with its probe bearing against the face of a catch on the sleeve lying in a radial plane.

3. A torque measuring device in accordance with claim 1, characterised by the fact that the means of adjustment of the angular displacement of the free end of the resilient sleeve in relation to the body consists of a screw engaged in a thread provided on the body, the end of the screw bearing against the face of a catch on the sleeve lying in a radial plane, the axis of the screw being perpendicular to that of the sleeve.

4. A torque measuring device in accordance with claim 2, characterised by the fact that the device for measuring the linear displacement consists of a comparator.

5. A torque measuring device in accordance with claim 1, characterised by the fact that the sleeve, the mid-portion of which is subject to deformation, is fitted within a tubular member, to which one of its ends is secured by a catch, the said tubular member being fitted within and secured to the body of the torque measuring device, while the free end of the sleeve bears against a plate fixed to the body at the bottom of the tubular member.

6. A torque measuring device in accordance with claim 1, characterised by the fact that a wheel is cottered to the rotary spindle, provision being made for the wheel rim, which is bevelled, to be brought to bear, through an opening in the body, with a roller-type wheel, which drives a revolution counter mounted on the body so as to swing about a pivot at right angles to its spindle.

References Cited
UNITED STATES PATENTS

| | | | |
|---|---|---|---|
| 1,926,825 | 9/1933 | Takahashi | 73—135 |
| 2,756,622 | 7/1956 | La Belle | 73—139 XR |
| 3,007,336 | 11/1961 | Livermont | 73—134 |
| 3,354,705 | 11/1967 | Dyer | 73—133 XR |
| 3,382,710 | 5/1968 | Aubeges et al. | 73—1 XR |

CHARLES A. RUEHL, Primary Examiner

U.S. Cl. X.R.

73—1